United States Patent [19]

Okamura et al.

[11] Patent Number: 4,858,849
[45] Date of Patent: Aug. 22, 1989

[54] TAPE CASSETTE HOUSING

[75] Inventors: Masatoshi Okamura, Saku; Haruo Shiba, Komoro; Kenji Hashizume; Yoshiya Sakata, both of Saku, all of Japan

[73] Assignee: TDK Corporation, Tokyo, Japan

[21] Appl. No.: 274,709

[22] Filed: Nov. 18, 1988

[30] Foreign Application Priority Data

May 2, 1985 [JP] Japan .................................. 60-65894

[51] Int. Cl.⁴ .................. G03B 1/04; G11B 23/04; B65D 43/14
[52] U.S. Cl. .................. 242/199; 220/334; 360/132
[58] Field of Search .................. 242/198, 199, 200; 360/132; 220/334

[56] References Cited

U.S. PATENT DOCUMENTS

| | | | |
|---|---|---|---|
| 4,485,988 | 12/1984 | Kikuya et al. | 242/198 |
| 4,556,153 | 12/1985 | Takagi et al. | 242/199 X |
| 4,564,120 | 1/1986 | Pertzsch et al. | 242/198 X |
| 4,628,389 | 12/1986 | Tanaka et al. | 242/198 X |

Primary Examiner—Thomas R. Hannon
Attorney, Agent, or Firm—Seidel, Gonda, Lavorgna & Monaco

[57] ABSTRACT

In a tape cassette housing including a lid which protects the tape at the front of the housing, and a lid locking member turnably pivoted in the housing and having two leg levers, one to lock the lid when the latter closes the front opening of the housing and the other to release the lid when the same is turned open, the distance between the rotational center of the pivot of the lid locking member and the crown of its head is longer than the distance between the center of pivot bearing in the housing and the rear wall of a space in which the lid locking member is mounted.

1 Claim, 2 Drawing Sheets

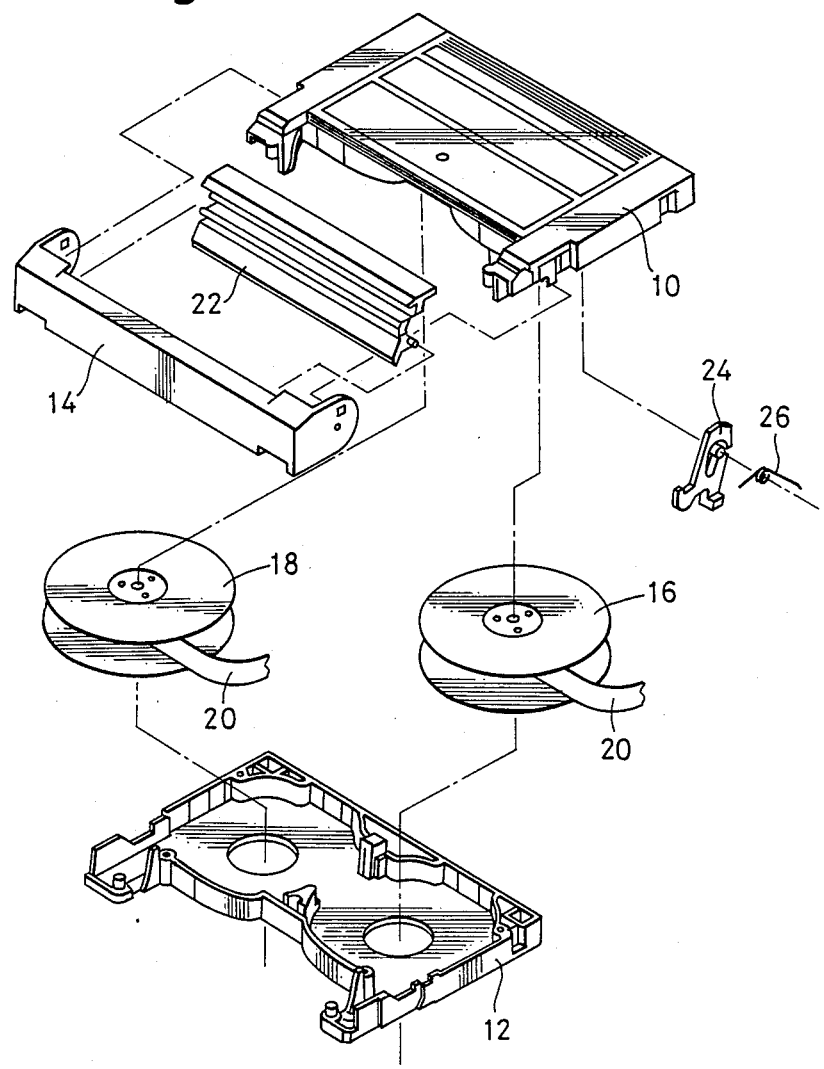

TAPE CASSETTE HOUSING

This is a continuation of co-pending application Ser. No. 855,031 filed on Apr. 22, 1986, now abandoned.

BACKGROUND OF THE INVENTION

This invention relates to a housing for a video, audio or other tape cassette which includes a lid protecting the run of the tape extended at the front of the housing and a lid locking member for controlling the lid motion. More particularly, it concerns a construction capable of preventing excessive turning of the lid locking member at the time the lid is turned open.

Cassettes holding a video tape or the like are provided with a front cover, known as lid, over the front opening of the housing. When the cassette is not in use, the lid keeps the front opening closed under the urging of a spring so as to cover and protect the otherwise exposed run of the tape. This prevents intrusion of dust from the front into the cassette and precludes the possibility of damaging or staining the tape with fingerprints, grease or the like at the time of cassette handling. Should such damaging or staining occur, signal occurs would result, leading to distorted images in the case of a video tape or sound skipping in an audio tape. Nevertheless, the tape cassette with the construction described is still partly open, at the front of the bottom of the casing, in order to be ready for cassette loading into the recorder. The front bottom corner remains open even when the cassette is unused, thus allowing dust intrusion through that opening. If the construction is used in a video tape cassette without modification, significant errors could result in the course of recording or playback because the video signals are highly susceptible to the influence of dust and other foreign matter. In view of this, the prevention of dust intrusion through the front bottom opening has been a problem of urgent importance. As an attempt to solve it, an improved construction, shown as exploded in FIG. 2, has already been developed. In the figure, the number 10 indicates an upper half housing section, 12 a lower half housing section, and 14 a front lid. Inside the space defined by these housing parts are accommodated other components such as a supply reel 16 and a take-up reel 18. A length of magnetic tape 20, contained on the supply reel 16, is adapted to be gradually moved to and accumulated on the take-up reel 18. The path of the magnetic tape extends from an opening formed near the right side walls of the upper and lower half housing sections 10, 12 to an opening formed near the left side walls, through a route in front of the front opening of the housing combinedly formed of those housing halves. The conventionally employed front lid 14 covers the exposed run of the magnetic tape 20 at the front side. Behind this front lid 14 is located a newly added inner lid 22, which covers the rear side of the tape to avoid intrusion of dust from below the front bottom corner of the housing. A lid locking member 24 is mounted, together with a lock spring 26, in the vicinity of the mating portions of the right side walls of the upper and lower half housing sections 10, 12. The lid locking member 24 functions to lock the front lid 14 and the inner lid 22 when the two lids close the front opening of the housing and release the lids when they are turned to open the housing. The lock spring 26 normally biases the lid locking member 24 to lock the lid 14, while forcing the member to turn about its axis.

FIG. 3 shows the lid locking member and its lock spring of FIG. 2 on an enlarged scale. The lid locking member, formed of a piece of plate, has a locking leg lever 28 and a releasing leg lever 30. The locking leg lever 28 projects perpendicularly frontward from the edge of the lid locking member 24 and then turns upward like a hook. The releasing leg lever 30 slightly projects perpendicularly frontward and then shifts sidewise, this time projecting perpendicularly outward from the planar wall portion. The lid locking member 24 further comprises a head 32 and a pivot 34 formed at a central point near the head 32. The pivot 34 is columnar-shaped and projects perpendicularly from the planar wall of the member 24. It is surrounded down to its root by a recess 36 for accommodating the lock spring 26. The axis 38, passing through the center of the pivot 34, is spaced a distance A from a parallel line extended from the crown of the head 32. The numberal 40 indicates a provisional stopper slightly projecting sideways from the planar wall of the lid locking member 24 for temporarily keeping the member from turning to excess.

FIG. 4 is an inside view of a fragment of the upper half housing section constituting the region for accommodating the lid locking member shown in FIG. 2. The numeral 42 designates the region where the lid locking member 24 is to be mounted. The region 42 has an inner wall 44, outer wall 46, and a rear wall 48, forming a slot 50, in which the lid locking member 24 is fitted and set in position. Bearing recesses 52 (52a, 52b) are formed in the inner and outer walls 44, 46 to support the pivot 34 of the lid locking member. Mirror image bearing recesses are formed in the lower half housing section 12 to mate the above recesses when the housing is assembled. The common centerline 54 of the bearings and the rear wall 48 are spaced apart a distance B. When this distance B is compared with the distance A between the center of rotation of the pivot 34 of the lid locking member 24 and the crown of the head 32, the relation B>A holds.

The act of setting such a video tape cassette in a recorder first forces the releasing leg lever 30 back to unlock the lid 14 that closes the front opening of the cassette. Then, with the turning of the lid locking member 24, the locking leg lever 28 keeping the lid 14 locked under the urging of the lock spring 26, with its hook end in engagement with a projection on a side wall of the lid 14, is disengaged. At the same time, the lid 14 turns fully to uncover the front opening of the housing. The housing having been opened, the releasing leg lever 30 is set free, and the lid locking member 24 is reset by dint of the lock spring 26 to the locking position. There is no possibility of its hook end engaging the projection on the side wall of the lid 14 since the lid has already concluded its turning motion. However, if the cassette is accidentally subjected to any excessive vibration of impact during the turn of the lid 14, the lid locking member 24 might turn too far in the locking direction, causing the releasing leg lever 30 to find its way wrongly into a gap formed between the side wall edge and the outer wall surface of the lower half housing section 12. Should this happen, the lid 14 would fail to return to the initial position and close the housing after the use of the cassette, because the lid turning in the locking direction would hit against the releasing leg lever 30 and be kept from further turning. In ordinary service conditions, of course, the provisional stopper 40 on the plate surface of the lid locking member comes in contact with the projection 41 formed on the inside of the outer side wall of the lower half housing section 12, as seen in FIG. 5, so as to keep the member from turning too far, beyond a given point, in the locking direction. However, the stopper 40 has a limitation in structure because of the necessity of inserting the lid locking member into the slot 50 for assembling. The stopper being simply designed as a provisional stop, excessive turning of the member can widen the gap between the inner and outer side walls until the member is disengaged from the projection of the outer wall. Thus, if the lid 14 fails to return to the original position, it would become difficult to take out the cassette from the recorder. A forcible attempt to take it out could fatally damage the tape, cassette, and even the recorder. Such excessive turning of the lid locking member 24 can also be caused by manual handling of the cassette.

SUMMARY OF THE INVENTION

The present invention, perfected with the foregoing in view, is aimed at providing a tape cassette equipped with a lid locking member of an improved structure whereby the member is completely kept from excessively turning in the locking direction, so that unloading of the cassette from the recorder presents no problem of damage or the like.

The above aim is attained, in accordance with the invention, by a tape cassette housing comprising a lid which protects the tape at the front of the housing, and a lid locking member turnably pivoted in the housing and having two leg levers, one to lock the lid when the latter closes the front opening of the housing and the other to release the lid when the same is turned open, the distance between the rotational center of the pivot of said lid locking member and the crown of the head thereof being longer than the distance between the center of a pivot bearing in the housing and the rear wall of the region in which said lid locking member is mounted.

BRIEF DESCRIPTION OF THE DRAWINGS

FIG. 2 is an exploded view of a conventional video tape cassette;

DETAILED DESCRIPTION

Figure 1:
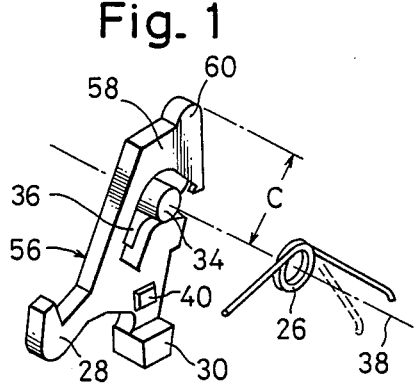
FIG. 1 is a perspective view of essential parts of an embodiment of the present invention.
Figure 5:
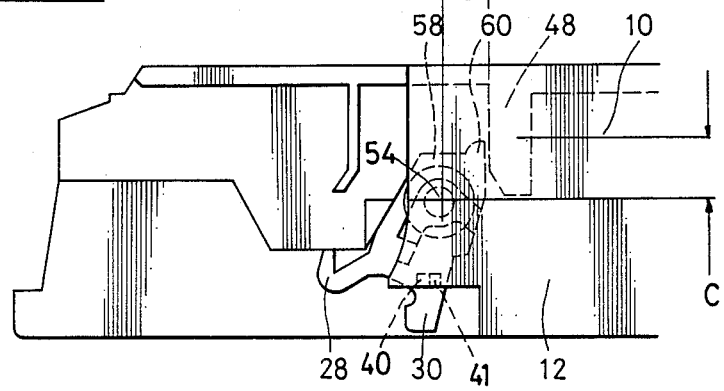
FIG. 5 is a partial section showing the lid locking member of the present invention mounted between upper and lower half housing sections.

Means for achieving the aim of the present invention will now be described with reference to FIGS. 1 and 5 showing the essential parts of the embodiment thereof.

The tape cassette housing of the invention includes a lid attached to the open front of the housing so as to provide protection for the tape contained therein, and a lid locking member 56 formed with leg levers 28, 30 one of which locks the lid when the latter has closed the front opening of the housing the the other releases the lid when the same is turned open. The distance C from the center of rotation of a pivot 34 of the lid locking member 56 to the crown of a head 58 is longer than the distance B from the bearing center of the housing to rear wall 48 of a space for accommodating the lid locking member 5.

The means described above function in the following way.

Setting the distance C between the rotational center of the pivot 34 of the lid locking member 56 and the crown of the head 58 greater than the distance B between the bearing center of the housing and the rear wall 48 of the region for accommodating the lid locking member prevents the locking member from turning beyond a given locking position. This is because, when the cassette is set in a recorder or when the lid locking member 56 is subjected to an excessive force to turn it in the locking direction, the member is stopped securely as its head 58 hits against the rear wall 48 of the space in which the member is mounted. Therefore, the lid has no possibility of "biting" the releasing leg lever 30. The result is that unloading the cassette from the recorder involves no difficulty or damage of the tape. Neither is there any danger of damaging the cassette or recorder.

An embodiment of the invention will be described below.

Figure 3:
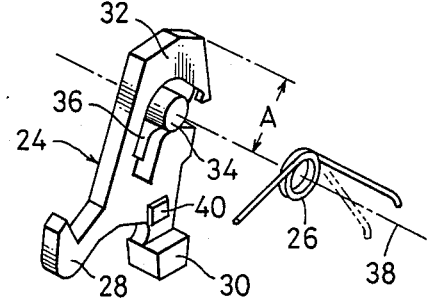
FIG. 3 is an enlarged view of the lid locking member and the associated lock spring shown in FIG. 2.
Figure 4:
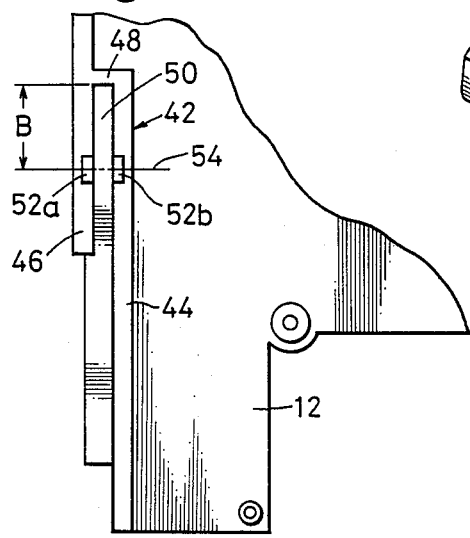
FIG. 4 is an inside view of the region of the upper half housing section shown in FIG. 2 where the lid locking member is to be mounted.

FIG. 1 is a perspective view (similar to FIG. 3 but) showing the essential parts of an embodiment of the invention. Compared with the conventional lid locking member, this embodiment differs in the structure of the head and in the addition of provisional locking members 40 and 41; the other parts are substantially the same as the corresponding parts of the conventional member. Hence, like parts are given like numerals and the description is omitted, although those parts may be referred to when necessary in explaining the essential parts of the present embodiment. In FIG. 1, the numeral 56 designates a lid locking member, whose head 58 is formed with a no-excess-turn stopper 60 arcuately projecting perpendicular to the edge. The lid locking member 56 also has a locking leg lever 28, releasing leg lever 30, pivot 34, spring-holding recess 36, and provisional stopper 40. The no-excess-turn stopper 60 formed on top of the head 58 naturally permits an increase in the distance C between the rotational center of the pivot 34 and the crown of the head, or the upper extremity of the no-excess-turn stopper 60, beyond the distance A between the rotational center of the pivot 34 and the crown of the head 32 of the conventional lid locking member 24. The distance C can be even longer than the distance B between the bearing center of the lower half housing section 12 and the rear wall 48, thus establishing the relation C>B. This partial modification in design of the head of the lid locking member makes it possible to avoid any excessive turning of the lid locking member beyond the desired locking position. When the cassette is set in a recorder or when too much force is exercised to turn the lid locking member 56 in the locking direction, the no-excess-turn stopper 60 at the head 58 hits against, and is completely stopped by, the rear wall 48 of the region 62 in which the member is accommodated. This eliminates all the troubles attendant on the excessive turning of the conventional lid locking member.

According to the present invention, as described above, the distance between the rotational center of the pivot of the lid locking member and the crown of the head is made longer than the distance between the bearing center of the housing and the rear wall of the slot in which the lid locking member is held. In this manner excessive turning of the lid locking member in the locking direction is completely prevented. Consequently, the troubles that might otherwise result from the excessive turning of the lid locking member, for example, the difficulty of taking out the tape cassette from the recorder and the possibility of damaging the tape, cassette, and/or recorder, are all averted.

What is claimed is:

1. A tape cassette comprising a housing consisting of an upper half and a lower half, a lid which protects the tape at the front of the housing, a space defined by a pair of side walls in said housing, and a lid locking member inserted in said space and provided with a pivot received in a bearing at a mating portion of the halves, said locking member having two leg levers, and a head extending upwardly into said upper half along a rear wall provided in said upper half, one of said leg levers being adapted to lock the lid when the latter closes the front opening of a housing and the other leg lever being adapted to release the lid when the same is turned open, said other leg lever being provided with a stop projected therefrom, said housing being provided with a stop on one of said side walls facing the stop on the locking member, the distance between the axis of a pivot of said lid locking member and the upper end of the head thereof being longer than the distance between the axis of said bearing and the rear wall of a space provided in said upper half, said two stops being at such positions that when they are engaged with each other said head is spaced from the said rear wall.

* * * * *